Jan. 26, 1960  S. W. NICKELLS  2,922,614
HUM-FREE SOLENOID DEVICE
Filed June 18, 1956
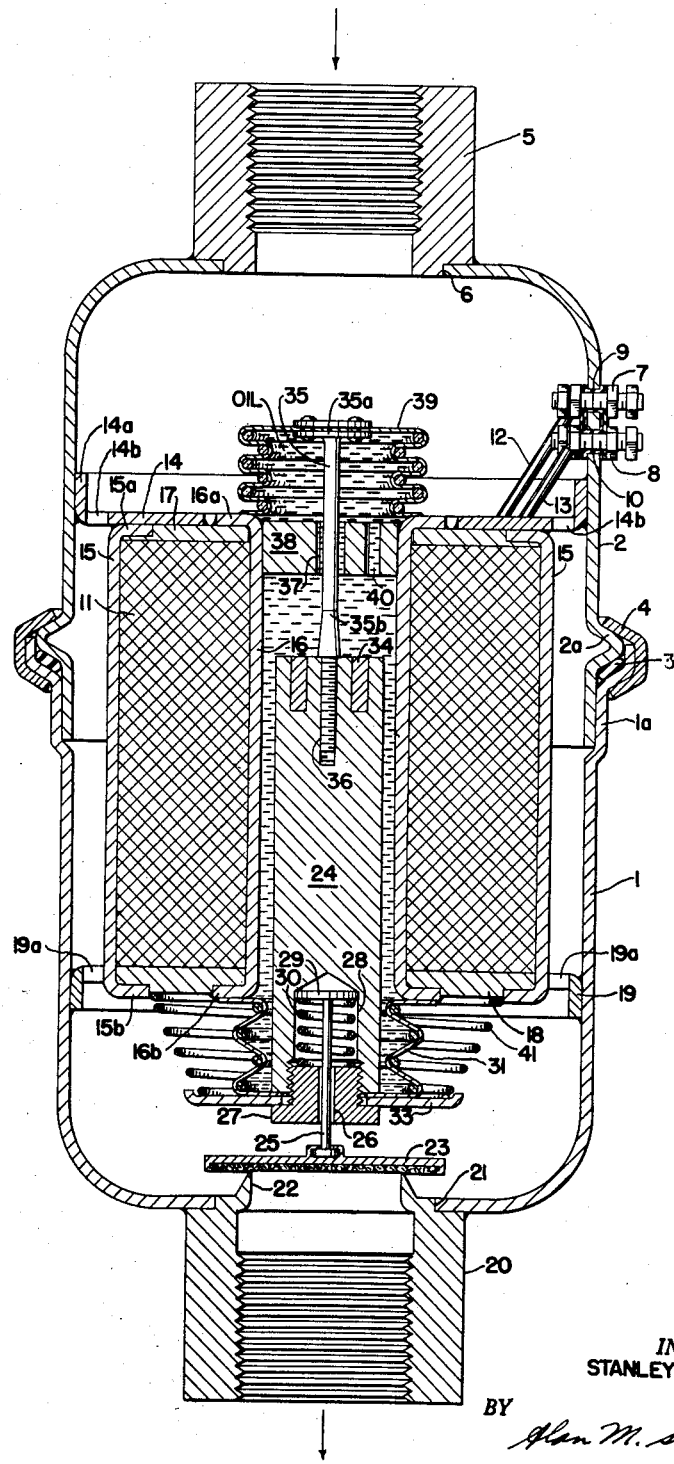
INVENTOR.
STANLEY W. NICKELLS
BY
*Alan M. Staubly*
ATTORNEY

2,922,614
HUM-FREE SOLENOID DEVICE

Stanley W. Nickells, Minneapolis, Minn., assignor to Minneapolis-Honeywell Regulator Company, Minneapolis, Minn., a corporation of Delaware Application June 18, 1956, Serial No. 592,068

7 Claims. (Cl. 251—54)

This invention relates to solenoid valves and, more particularly, to quiet operating solenoid valves particularly suitable for use in gas heat systems.

One of the objects of this invention is to provide a very compact solenoid gas valve that is quiet in operation, reliable and inexpensive.

Another object of the invention is to provide a solenoid gas valve wherein the movement of the plunger of the solenoid is fluid dampened to reduce noise and wherein the plunger is sealed against deposits from the gas being controlled and provides "hammer action" for the valve.

Other objects of the invention will become apparent upon reading the following detailed description of the invention in conjunction with the accompanying drawing.

The single figure of the drawing shows the valve in cross-section along the longitudinal axis thereof.

The valve comprises a valve body or housing formed of two generally cup-shaped members 1 and 2 which are joined together at their open ends to form a substantially cylindrical housing. The member 1 has an outwardly and upwardly extending stepped portion 1a that telescopically receives the lower end of the upper body member 2. Spaced inwardly from the open end of the member 2, is an outwardly struck annular rib portion 2a. A rubber O-ring 3 is clamped between the portion 1a and the portion 2a to form a gas-tight seal. A wraparound strap member 4 serves as the means for holding the two portions 1 and 2 in assembled relationship.

The body portion 2 has an internally threaded sleeve portion 5 welded or otherwise secured in an opening 6 in the closed end of the member 2 and has two electric terminal members 7 and 8 extending through holes 9 and 10, respectively, for the reception of lead wires (not shown) to connect the valve to a control system. The terminals 7 and 8 are connected to a solenoid coil 11 by means of leads 12 and 13 extending through holes (not shown) in a mounting plate 14.

The plate 14 has a plurality of arcuate slots 14b extending around the periphery thereof adjacent an upwardly extending flange portion 14a that is welded or otherwise secured to the body portion 2. The coil 11 is mounted between a sleeve 15 of magnetic material having inwardly extending annular flanges 15a and an inner sleeve 16 of nonmagnetic material having outwardly extending annular flanges 16a and 16b. The upper flanges are welded or brazed or otherwise secured to a washer 17 of magnetic material while the lower flanges 15b and 16b are similarly secured to a magnetic washer 18. A spacer sleeve 19, which is welded to the body portion 1 and has a plurality of radially and inwardly extending fingers 19a which serve to hold the coil 11 centrally of the body portions 1 and 2, provides for the flow of fluid through the valve body between the coil and the body members 1 and 2.

An internally threaded sleeve 20 is secured in an opening 21 in the closed end of the body member 1 to serve as the outlet for the valve. It has an upwardly extending flange portion 22 that terminates in an annular knife-edge valve seat for a valve head 23. The valve head is secured to a solenoid plunger 24 by having its valve stem 25 extend through an axial bore 26 in a clamping nut 27 that, in turn, is screw threaded into a bore 28 in the lower end of the plunger 24. The inner end of the stem 25 has a head portion 29 that is biased upwardly against the inner end of the bore 28 by means of a coil compression spring 30, for a purpose to be described later.

A bellows 31, having an open upper end, surrounds the lower end of the plunger 24 and is brazed or otherwise secured to the lower end of the sleeve 16 which forms a plunger tube for the plunger 24. The closed lower end of the bellows 31 has an axial aperture therein which is brazed or otherwise secured to the plunger 24 and is clamped against the end of the plunger 24 by the nut 27 bearing against a spring retainer washer 33 positioned between the head of the bolt 27 and the outer surface of the bellows 31. It is thus seen that no fluid can enter into or out of the plunger tube at the lower end thereof. Should a synthetic rubber bellows be used, it would have to be clamped to the end of the sleeve 16.

The upper end of the plunger 24 has a shading ring 34 therein and a stem 35 screw threaded in an axial bore 36 in the upper end of the plunger 24. This stem extends through an axial bore 37 in a plug 38 of magnetic material which is brazed or otherwise secured in the upper end of the plunger tube 16. The upper end of the stem 35 carries a head portion 35a that is riveted or otherwise secured to the closed end of a bellows 39 while the lower end has a tapered portion 35b adjacent the end of plunger 24. The other end of the bellows 39 is open and is brazed or otherwise secured to the upper end of the tube 16 to seal the tube 16 from the flow of fluid into or out of the tube 16. The space between the plunger tube 16, the bellows 31, the plunger 24 and the interior of the bellows 39 is filled with oil or some other suitable liquid so that as the plunger 24 moves longitudinally in the tube 16, oil will have to be forced through the bore 37 around the stem 35 and thus dampen the action of the plunger 24 in the tube.

As the tapered portion 35b enters the bore 37, the rate of movement of the plunger is gradually reduced so that there will be practically no noise resulting from the striking of the plunger against the plug stop 38.

Should the diameter of the bore 37 be only slightly larger than the diameter of the stem 35, as to guide the movement of the plunger 24 but to cause the movement to be too slow, a second bore 40 may be provided through the end plug 38. It is thus seen that by proper selection of the size and/or shape of the bore 37 or by the use of an additional bore 40 of the desired size, the speed of movement of the plunger 24 may be regulated.

The plunger 24 is normally biased outwardly of the tube 16 by means of a coiled compression spring 41 extending between the coil washer 18 and the spring retainer 33 mounted on the outer end of the plunger. As the spring 30 normally holds the head 29 of the valve stem against the inner end of the bore 28 in the plunger, the valve 23 is held in seating engagement with the valve seat 22 by the spring 41, the weight of the plunger assembly, and the pressure of the fluid within the valve body.

OPERATION

The valve is illustrated as being in its closed position. That is, the coil 11 is de-energized, which permits the spring 41 to bias the plunger 24 outwardly of the plunger tube 16 and to hold the valve 23 against the seat 22.

Upon energization of the coil 11, the plunger 24 will be drawn into the tube 16 as fast as the liquid within the tube can pass through the opening 37 and the opening 40. As the plunger moves inwardly the spring 30 will initially compress until the force exerted by the spring on the stem 25 is greater than the force holding the valve 23 against the valve seat. This usually takes place when the spring has been fully compressed as to give a positive connection between the head 29 and the nut 27 which results in a hammer-like blow on the head to break the valve 23 off of its seat. Once the valve is off its seat, equalization of pressures on the two sides of the valve 23 will permit the spring 30 to snap the valve as fast as the liquid can flow through the openings 37 and 40 under the bias of spring 41.

As various modifications may be made in the above design without departing from the spirit of the invention, the scope of the invention should be determined solely from the appended claims.

I claim:

1. A fluid flow control device comprising a body having an inlet and an outlet substantially in alignment, a solenoid coil positioned between said inlet and outlet and substantially coaxial therewith, means for supporting said coil in spaced relationship with all walls of said body to provide for free flow of fluid from said inlet to said outlet around said coil, said coil having a tube therein closed at one end and open at its other end, said closed end having an axial bore therethrough, a solenoid plunger of smaller diameter than the bore of said tube to provide a flow passage therebetween and positioned in said tube and having one end thereof extending beyond the open end of said tube and having a rod extension at its other end extending through said axial bore, said rod extension being of slightly smaller diameter than said axial bore to provide a restricted flow passage about said rod, a first bellows having a closed end connected to the outer end of said extension rod and an open end sealingly connected to the closed end of the tube, a second bellows having a closed end connected to said one end of said plunger and an open end sealingly connected to the open end of said tube, said bellows and said tube being filled with fluid, and a valve connected to said one end of the plunger and cooperating with said outlet to control the flow of fluid therethrough.

2. A solenoid control actuator comprising a housing, a tube having a closed end and an open end supported in said housing, a solenoid coil encircling said tube, said closed end of said tube having an opening therethrough, a plunger of slightly smaller diameter than the bore of said tube to provide a restricted flow passage about said plunger and positioned in said tube and projecting beyond both ends of said tube, a first flexible wall connected to one end of said plunger and sealingly connected to said tube around the closed end thereof, a second flexible wall connected to the other end of the plunger projecting beyond the open end of said tube and sealingly connected to said tube around the open end thereof, fluid filling said tube and the spaces between said tube and said flexible walls, and a control member operably connected to said plunger.

3. A control device comprising a body having an inlet and an outlet with a valve seat therebetween, a tube having a closed end and an open end supported in said body in spaced relationship with the walls of said body, a solenoid coil surrounding said tube, said closed end of said tube having an opening therethrough, a plunger of slightly smaller diameter than the bore of said tube to form a restricted passage and positioned in said tube and having a reduced diameter portion projecting through said opening and having another portion projecting beyond the open end of said tube, said reduced diameter portion increasing in diameter from a point spaced from said plunger to said plunger, a first movable wall sealingly connected to said tube around the closed end thereof and forming a closed chamber communicating with said opening, a second movable wall connected to the portion of the plunger projecting beyond the open end of said tube and sealingly connected to said tube around the open end thereof, liquid substantially filling said tube and the spaces between said tube and said movable walls, and a valve connected to said plunger and normally engaging said valve seat.

4. A control device comprising control means, a solenoid plunger connected to said means, a solenoid tube in which said plunger is arranged to move, said plunger being of slightly smaller diameter than the bore of said tube to form a restricted passage, a solenoid coil surrounding said tube, one end of said plunger being connected to a first movable wall that is sealingly connected to the adjacent end of said tube, the other end of said tube being closed by a fixed wall, said fixed wall having an aperture therethrough, a second movable wall sealingly fixed to said tube around said aperture and forming a closed chamber communicating with said aperture and fluid filling the spaces within the tube and between the first and second movable walls.

5. The structure of claim 4 in combination with means of gradually increasing diameter extending through said aperture and connecting said plunger to said second movable wall for varying the size of the fluid flow passage through said aperture as the plunger approaches said fixed wall to vary the speed of the plunger in said tube.

6. A solenoid comprising a tube having a closed end and an open end, a solenoid coil extending around said tube, said closed end of said tube having an opening therethrough of smaller diameter than said tube, a plunger of slightly smaller diameter than the bore of said tube and positioned in said tube and projecting beyond the open end of said tube, an expandable liquid receiving chamber surrounding the closed end of said tube and communicating with said opening, an expandable chamber connected to said plunger and sealing said open end of said tube, and liquid filling said tube and chambers so that upon energization of said coil liquid will be forced through said opening and said plunger will move slowly into engagement with said closed end of said tube.

7. The combination defined in claim 3 wherein said reduced diameter portion is connected at its outer end to said first movable wall so as to be guided thereby.

References Cited in the file of this patent

UNITED STATES PATENTS

| | | |
|---|---|---|
| 2,457,739 | Sherrill | Dec. 28, 1948 |
| 2,469,038 | Winkler | May 3, 1949 |
| 2,489,381 | Lindahl | Nov. 29, 1949 |
| 2,580,433 | Kain | Jan. 1, 1952 |
| 2,606,261 | Titus | Aug. 5, 1952 |
| 2,652,848 | Wick | Sept. 22, 1953 |
| 2,698,404 | Edwards | Dec. 28, 1954 |
| 2,732,848 | Guelson | Jan. 31, 1956 |